Sept. 22, 1959  A. H. LAMB ET AL  2,904,996
APPARATUS FOR COMPARING THE MOISTURE TRANSMISSION
CHARACTERISTICS OF MATERIALS
Filed Sept. 21, 1953

INVENTORS:
Anthony H. Lamb
Earl R. Kebbon
BY Taylor, Cifelli & Jurick
ATTORNEYS.

20

United States Patent Office 2,904,996
Patented Sept. 22, 1959

2,904,996

APPARATUS FOR COMPARING THE MOISTURE TRANSMISSION CHARACTERISTICS OF MATERIALS

Anthony H. Lamb, Hillside, and Earl R. Kebbon, Chatham, N.J., assignors, by mesne assignments, to Daystrom, Incorporated, Murray Hill, N.J., a corporation of New Jersey Application September 21, 1953, Serial No. 381,232

9 Claims. (Cl. 73—73)

This invention relates to apparatus for comparing the moisture transmission characteristics of sheet materials such as plastics, leather, wax paper, and the like.

Objects of the invention are to provide testing apparatus which is characterized by the use of two humidity chambers having domed covers for clamping sheets of material over the chambers, humidity sensitive resistance elements in the domed covers, and an electrical circuit for measuring the resistances of the respective resistance elements. An object is to provide apparatus of the character stated in which the measuring circuit includes a periodically actuated switch for connecting the two humidity-sensitive resistance elements in alternation into the measuring circuit. A further object is to provide apparatus of the character stated which includes a recorder for plotting the measured resistance values over an extended period.

These and other objects and the advantages of the invention will be apparent from the following specification when taken with the accompanying drawing, in which.

Figure 2:
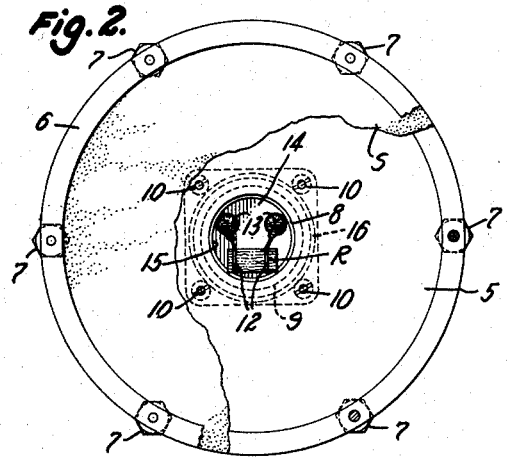
Fig. 2 is a bottom plan view of the cover of one of the humidity chambers as seen when removed from the water container and with part of the specimen broken away to show the resistance element.
Figure 1:
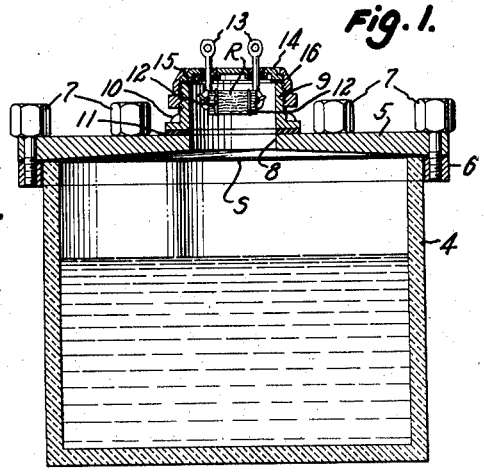
Fig. 1 is a vertical section through one of the humidity chambers embodying the invention.

In Figure 1 of the drawing, the reference numeral 4 identifies a water container provided with a cover comprising a slightly dished plate 5 and an annular ring 6 between which a specimen S to be tested may be clamped by screws 7. The cover 5 is provided with a central opening 8 through which a humidity-sensitive element R is exposed to the atmosphere above the specimen S. Such moisture-sensitive element may be made of various, inert hygroscopic materials, capable of absorbing and/or adsorbing moisture from the surrounding atmosphere and whose electrical resistance varies with the amount of its contained water vapor in a reversible and repeated manner. The preferred material is of a cellulosic character, such as balsa wood, fir wood, compressed cotton, since such materials are relatively inexpensive, are easy to shape to a desired form and, importantly, are highly responsive to moisture changes in a repeatable and reversible manner. The resistor R may be mounted upon the plate 5 in any desired manner but preferably, as shown, an externally threaded socket 9 is mounted on the plate 5 and over the opening 8 by screws 10, a sealing gasket 11 being interposed between the socket 9 and the plate 5. The resistor R is secured by wires 12 to terminals 13 which extend through and are insulated from a circular terminal plate 14 that is clamped upon a sealing gasket 15 at the end of the socket 9 by a gland nut 16.

Two identical humidity chambers of the described construction are provided for the comparison of the relative moisture transmission of different grades of like products as, for example, waxed papers. For clarity of illustration, the thickness of the specimen S has been exaggerated in Fig. 1 of the drawings. Due to the slight domed or dished construction of the cover plate 5, substantially the entire area of the specimen S is available for moisture transmission, and the diameter of the container 4 is preferably relatively large, for example of the order of 4 inches.

Figure 3:
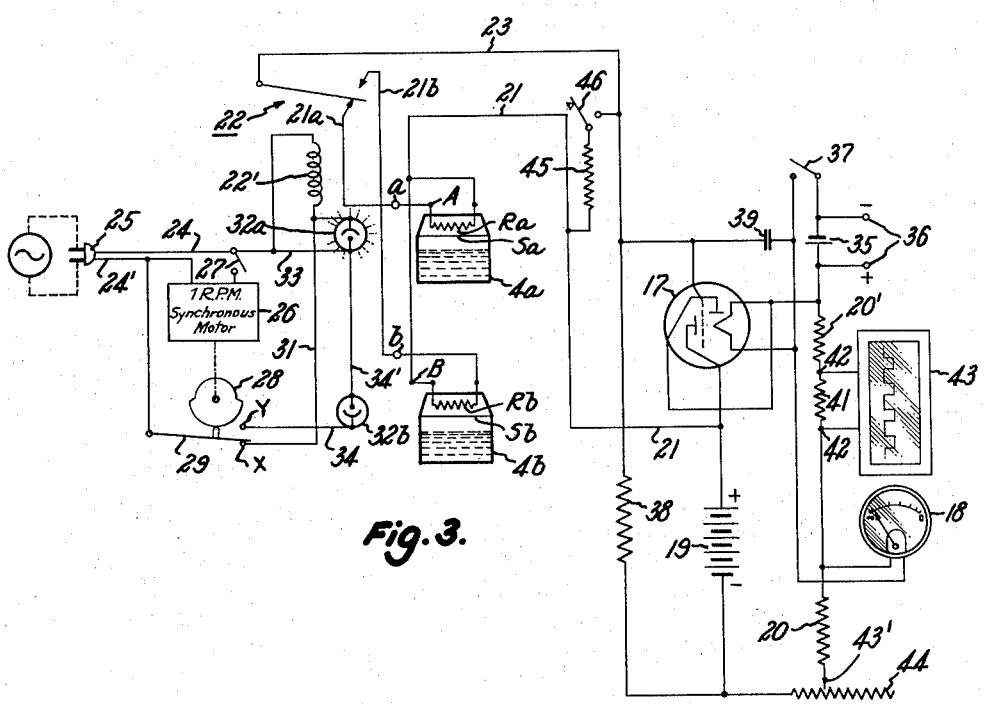
Fig. 3 is a wiring diagram of the measuring circuit.

The measuring circuit as shown in Fig. 3 is a modification of the megohmmeter described in United States Patent No. 2,510,691 issued to R. W. Gilbert on June 6, 1950, and comprises a high-mu vacuum tube 17, specifically a 1LH4, a series cathode microammeter 18, an anode battery 19, and limiting resistors 20, 20' in the cathode circuit. The tube and associated elements are preferably housed in a portable case, not shown, having two pairs of external terminals A, $a$ and B, $b$ for receiving leads from resistors $R_a$, $R_b$, in identical humidity chambers, 4$a$, 4$b$ in which specimens S$a$, S$b$ respectively are mounted. A lead 21 extends from the positive terminal of the anode battery 19 to the terminals A and B. Leads 21$a$, 21$b$ extend from the second terminals $a$ and $b$ of the respective pairs to the opposed stationary contacts of a power relay 22, the movable contact of the relay being connected by a lead 23 to the grid of the tube 17.

The relay 22 is energized from leads 24, 24' which terminate in a plug 25 for insertion in a socket of the usual 110 volt power and light circuit. A synchronous clock motor 26 is connected across leads 24, 24' by switch 27 to drive a cam 28 at a low speed, say one revolution per minute, to operate the single-pole, double-throw switch 29 to energize the relay 22 for alternate periods of one-half minute each. One terminal of the relay coil 22' is directly connected to the lead 24 and the opposite terminal is connected by lead 31 to contact X of the switch 29. A small neon pilot light 32$a$ is connected across leads 31 and 24 in parallel with the relay coil 22' by means of a jumper 33. Pilot light 32$b$ is connected between contact Y of switch 29 and the jumper 33 by leads 34 and 34'. As illustrated, cam 28 has closed the switch 29 on contact X to energize the relay 22, thereby connecting the resistor $R_a$ of the humidity chamber 4$a$, between the anode battery and the grid of tube 17. At the same time, the pilot light 32$a$ is lighted to indicate that resistor $R_a$ is connected into the measuring circuit. On further rotation of the cam 28, the switch blade 29 will return to contact Y, thus deenergizing the relay 22 to connect the resistor $R_b$ into the measuring circuit and to light the pilot lamp 32$b$ to indicate this change in the circuit connections.

A small flashlight battery 35 is arranged within the portable case, not shown, for heating the filamentary cathode, and if desired, a set of terminals 36 may be provided on the case for connecting in an auxiliary external battery for heating the cathode.

A switch 37 is provided in the cathode circuit of the tube and a grid resistor 38 is preferably arranged between the negative terminal of the anode battery 19 and the grid. The tube grid is connected to the cathode circuit by a condenser 39 which serves to reduce the shock impulse on the instrument 18 when switching from one resistor to the other. The cathode circuit includes a resistor 41 between terminals 42 across which a recorder 43 may be connected since it is frequently necessary to continue a test for several hours before major differences in the moisture transmission rates of the two specimens are developed. The cathode circuit is returned to the negative terminal of the anode battery 19 through a tap 43' on a resistance 44 to adjust the reading of the instrument 18 to a preselected value when a known resistance 45 is momentarily connected between lead 21 and the tube grid by a push-button switch 46.

Two identical humidity chambers are of course employed in the comparison testing of two specimens. At the start of a test run each sample disposed across the cover of each chamber is dried, in which case the instrument readings, and recorded record, for each sample will be identical. The covers are then placed over the glass containers which are partially filled with water. In time, more moisture may be transmitted through one of the samples into the cover portion housing the humidity-sensitive element than through the other sample, and such difference will be shown on the indicating instrument and on the record.

The mechanical operation of the measuring circuit will be apparent from the above description of the cyclic energization of relay 22 by the switch 29. The electrical operation of the measuring circuit is as follows:

With a high mu triode tube operated with a relatively low anode voltage, the grid-cathode contact potential will substantially block conduction with zero input current. With a positive voltage impressed upon the grid, the anode current will increase substantially as the logarithm of the grid current. Such log relationship develops from the dissipation of the space charge about the grid by diffusion, the latter being logarithmic in character. As the grid current increases the potential drop due to grid current through the cathode resistor reduces the anode potential and this results in a further increase in the range of the instrument calibration. At full scale grid current, the anode potential is reduced substantially to zero, the anode current is very low, and the cathode current through the meter is almost entirely grid current.

The circuit thus develops a wide range logarithmic relationship between an input current and an output current which is impressed upon a linear direct current instrument or recorder, and thus serves as a wide range ohmmeter which is well suited for the measurement of the effective resistances of the moisture-sensitive cellulosic resistors $Ra$ and $Rb$.

While the described apparatus is intended primarily for comparing the moisture-transmission characteristics of specimens of sheet material, it will be apparent that the measuring circuit may be employed to compare the effective resistance values of any two resistors, and that other megohmmeter circuits could be employed to measure the effective resistances of humidity-sensitive resistors mounted in the described humidity chambers.

We claim:

1. In apparatus for determining the moisture-transmission characteristics of sheet material, a humidity chamber comprising an open-topped container for water, a removable cover adapted to rest upon the top of said container, said cover comprising an upwardly domed plate and means for clamping a specimen of sheet material across the lower face thereof, said domed plate having an opening therethrough, means secured to said plate to form a sealed chamber over said opening, and a humidity-sensitive resistance element supported within said sealed chamber.

2. The invention as recited in claim 1, wherein the means forming the sealed chamber over said opening comprises an externally threaded socket secured to the upper surface of said upwardly domed plate and over the opening therethrough, a gasket at the upper end of said socket, a circular plate seated on said gasket, and a gland nut threaded upon said socket to clamp said circular plate upon said gasket.

3. The invention as recited in claim 2, wherein electrical terminals for said resistance element extend through and are insulated from said circular plate.

4. Apparatus for determining the moisture transmission characteristics of sheet material comprising a humidity chamber with an open-topped container for water; a removable cover adapted to rest upon the top of the container, said cover comprising an upwardly domed plate including means for clamping a specimen of sheet material across the lower face thereof said plate having an opening therethrough; means secured to said plate to form a sealed chamber over said opening; a humidity-sensitive resistance element supported within said chamber; a vacuum tube having a grid and an anode cooperating with a cathode; a source of anode voltage having a positive terminal connected to said tube anode; a cathode circuit connected between the negative terminal of said voltage source and the tube cathode, said cathode circuit including, in series, a direct current measuring instrument and a source of current heating said tube cathode; a pair of leads connected to the said resistance element and extending externally of the chamber, one of said leads being connected to the positive terminal of said anode voltage source and the other lead being connected to the tube grid.

5. Apparatus for comparing the moisture transmission characteristics of two specimens of sheet material comprising two open-topped containers for water; removable covers adapted to rest upon the top of each container, each cover comprising an upwardly domed plate having an opening therethrough and including means for clamping a specimen of the sheet material across the lower face thereof; means secured to each plate to form a sealed chamber over the said opening; a humidity-sensitive resistance element supported within each chamber; a vacuum tube having a grid and anode cooperating with a cathode; a source of anode voltage having a positive terminal connected to said tube anode; a cathode circuit connected between the negative terminal of said voltage source and the tube cathode, said circuit including, in series, a direct current measuring instrument and a source of current for heating said tube cathode; a pair of leads connected to each said resistance element, one lead of each pair being connected to the said positive terminal of the anode voltage source; and cyclically-operating means connecting the other lead of each pair in alternation to the tube grid.

6. The invention as recited in claim 5, including a resistor in series with the instrument and source of heating current, and a recorder connected across said resistor.

7. In apparatus to determine the moisture transmission characteristics of sheet material comprising a humidity chamber, means for clamping a specimen of sheet material for exposure to humidity from said chamber, and means for holding a humidity-sensitive resistance element for subjection to moisture passing through said specimen; a circuit for testing the resistance of said sensitive element while changing due to the action of specimen-transmitted moisture thereon, in order to measure the moisture transmission of the specimen, comprising a vacuum tube having a grid and an anode cooperating with a cathode; a source of anode voltage having its positive terminal connected to said anode; a cathode circuit connected between the negative terminal of said voltage source and the tube cathode, the cathode circuit including, in series, a direct current measuring instrument and means for heating said cathode; a pair of leads connected to said resistance element, one of said leads being connected to the positive terminal of said anode voltage source and the other of said leads being connected to the tube grid, whereby a logarithm relationship is developed for increasing the range of the instrument calibration.

8. In apparatus for comparing the moisture transmission characteristics of two specimens of sheet material comprising two identical humidity chambers, means for clamping said specimens of sheet material for respective exposure to humidity from said chambers, and means in each chamber for holding a humidity-sensitive resistance element for subjection to moisture passing through said specimen; a circuit for comparing the resistances of said sensitive elements while changing due to the action of specimen-transmitted moisture thereon, in order to compare the moisture-transmission characteristics of said specimens, comprising a vacuum tube having a grid and an anode cooperating with a cathode, a source of anode voltage having a positive terminal connected to said anode, a cathode circuit connected between the negative terminal of said voltage source and the cathode, said circuit including, in series, a direct current measuring instrument and means for heating said cathode, a pair of leads connected to each of said resistance elements, one lead of each pair being connected to the said positive terminal of the anode voltage source; and cyclically-operating means connecting the other lead of each pair in alternation to the tube grid.

9. The invention as recited in claim 8, including a resistor in series with the instrument and cathode heating means, and a recorder connected across said resistor.

References Cited in the file of this patent
UNITED STATES PATENTS

| | | |
|---|---|---|
| 1,014,842 | Muckenfuss | Jan. 16, 1912 |
| 1,391,041 | Boon et al. | Sept. 20, 1921 |
| 1,827,562 | Carpenter | Oct. 13, 1931 |
| 1,855,774 | Schneider | Apr. 26, 1932 |
| 2,294,511 | Neiman | Sept. 1, 1942 |
| 2,345,935 | Hassler | Apr. 4, 1944 |
| 2,390,252 | Hayward | Dec. 4, 1945 |
| 2,460,655 | Rickmeyer | Feb. 1, 1949 |
| 2,491,689 | Pollock | Dec. 20, 1949 |
| 2,536,022 | Beach et al. | Jan. 2, 1951 |
| 2,585,121 | Hartman | Feb. 12, 1952 |
| 2,608,604 | Hart | Aug. 26, 1952 |
| 2,636,962 | Bouyoucos | Apr. 28, 1953 |
| 2,742,780 | Feigal et al. | Apr. 24, 1956 |